(12) United States Patent
Li et al.

(10) Patent No.: US 11,048,910 B2
(45) Date of Patent: Jun. 29, 2021

(54) FINGERPRINT IDENTIFICATION DEVICE, METHOD AND ELECTRONIC DEVICE

(71) Applicant: SHENZHEN GOODIX TECHNOLOGY CO., LTD., Shenzhen (CN)

(72) Inventors: Shunzhan Li, Shenzhen (CN); Xiang Cheng, Shenzhen (CN); Qin Gu, Shenzhen (CN); Yonghui Wu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/416,166

(22) Filed: May 18, 2019

(65) Prior Publication Data

US 2020/0193138 A1    Jun. 18, 2020

Related U.S. Application Data

(63) Continuation of application No. PCT/CN2018/120893, filed on Dec. 13, 2018.

(51) Int. Cl.
*G06K 9/00* (2006.01)
*G02B 5/20* (2006.01)
*G06K 9/62* (2006.01)

(52) U.S. Cl.
CPC ......... *G06K 9/00114* (2013.01); *G02B 5/201* (2013.01); *G06K 9/0004* (2013.01);
(Continued)

(58) Field of Classification Search
CPC ............ G06K 9/00114; G06K 9/6262; G06K 9/6256; G06K 9/0004; G06K 9/00087; G02B 5/201
See application file for complete search history.

(56) References Cited

U.S. PATENT DOCUMENTS 8,339,486 B2    12/2012  Nakashiba
8,768,015 B2    7/2014   Higuchi
(Continued)

FOREIGN PATENT DOCUMENTS

CN    101083274 A    12/2007
CN    102103685 A    6/2011
(Continued)

OTHER PUBLICATIONS

Gil Abramovich et al. "Spoof Detection Method for Contactless Fingerprint Collection Utilizing Spectrum and Polarization Diversity", Proc. of SPIE vol. 7680, http://proceedings.spiedigitallibrary.org/, Apr. 28, 2010, 11 pages total.

*Primary Examiner* — Premal R Patel
(74) *Attorney, Agent, or Firm* — Scully Scott Murphy & Presser

(57) ABSTRACT

Provided are a fingerprint identification device, a fingerprint identification method and an electronic device, which could improve security of fingerprint identification. The fingerprint identification device includes an optical fingerprint sensor including a plurality of pixel units; at least two filter units disposed above at least two pixel units of the plurality of pixel units, where each filter unit corresponds to one pixel unit, and the at least two filter units comprise filter units in at least two colors.

15 Claims, 5 Drawing Sheets

(52) U.S. Cl.
CPC ....... *G06K 9/0012* (2013.01); *G06K 9/00087* (2013.01); *G06K 9/00906* (2013.01); *G06K 9/6256* (2013.01); *G06K 9/6262* (2013.01)

(56) References Cited

U.S. PATENT DOCUMENTS

| | | | |
|---|---|---|---|
| 8,787,630 B2 | 7/2014 | Rowe | |
| 9,165,178 B2 | 10/2015 | Higuchi | |
| 9,934,421 B1* | 4/2018 | Nilsson | G06K 9/0012 |
| 10,031,602 B2 | 7/2018 | Kitchens, II et al. | |
| 2005/0271258 A1† | 12/2005 | Rowe | |
| 2007/0285541 A1 | 12/2007 | Nakashiba | |
| 2011/0165911 A1 | 7/2011 | Rowe | |
| 2012/0070043 A1 | 3/2012 | Higuchi | |
| 2013/0076911 A1* | 3/2013 | Nakashiba | H04N 9/045 348/164 |
| 2014/0254895 A1 | 9/2014 | Higuchi | |
| 2014/0354597 A1 | 12/2014 | Kitchens, II et al. | |
| 2014/0354608 A1 | 12/2014 | Kitchens, II et al. | |
| 2014/0354823 A1 | 12/2014 | Kitchens et al. | |
| 2014/0354905 A1 | 12/2014 | Kitchens et al. | |
| 2016/0320234 A1* | 11/2016 | Zhou | G06K 9/00906 |
| 2017/0199610 A1 | 7/2017 | Kitchens, II et al. | |
| 2017/0213019 A1 | 7/2017 | Mao | |
| 2017/0357840 A1† | 12/2017 | Chen | |
| 2017/0371213 A1* | 12/2017 | Wang | G02F 1/1362 |
| 2018/0046848 A1 | 2/2018 | Zhou | |
| 2018/0047776 A1† | 2/2018 | Suzuki | |
| 2018/0089491 A1* | 3/2018 | Kim | G02B 6/0088 |
| 2018/0165496 A1* | 6/2018 | Cheng | G06K 9/00053 |
| 2018/0204040 A1* | 7/2018 | Kwon | G06F 1/3215 |
| 2018/0225498 A1* | 8/2018 | Setlak | G06K 9/00026 |
| 2019/0019000 A1* | 1/2019 | Lee | H01L 27/14678 |
| 2019/0157337 A1* | 5/2019 | Lin | H01L 31/167 |
| 2019/0179488 A1* | 6/2019 | Klenkler | G06K 9/0004 |
| 2019/0279580 A1* | 9/2019 | Noh | G09G 3/3413 |
| 2019/0347464 A1* | 11/2019 | Shen | G06K 9/2027 |
| 2020/0074136 A1* | 3/2020 | Shi | G06F 3/0412 |
| 2020/0133414 A1* | 4/2020 | Lee | G06K 9/00087 |

FOREIGN PATENT DOCUMENTS

| | | |
|---|---|---|
| CN | 102693414 A | 9/2012 |
| CN | 102804229 A | 11/2012 |
| CN | 103544474 A | 1/2014 |
| CN | 103679152 A | 3/2014 |
| CN | 105303179 A | 2/2016 |
| CN | 105469106 A | 4/2016 |
| CN | 107480579 A | 12/2017 |
| CN | 108596124 A | 9/2018 |
| CN | 109255285 A | 1/2019 |
| CN | 209168144 U | 7/2019 |
| CN | 210091193 U | 2/2020 |
| CN | 211529173 U | 9/2020 |
| JP | S61153779 A | 7/1986 |
| WO | 2008/111994 A1 | 9/2008 |

\* cited by examiner
† cited by third party

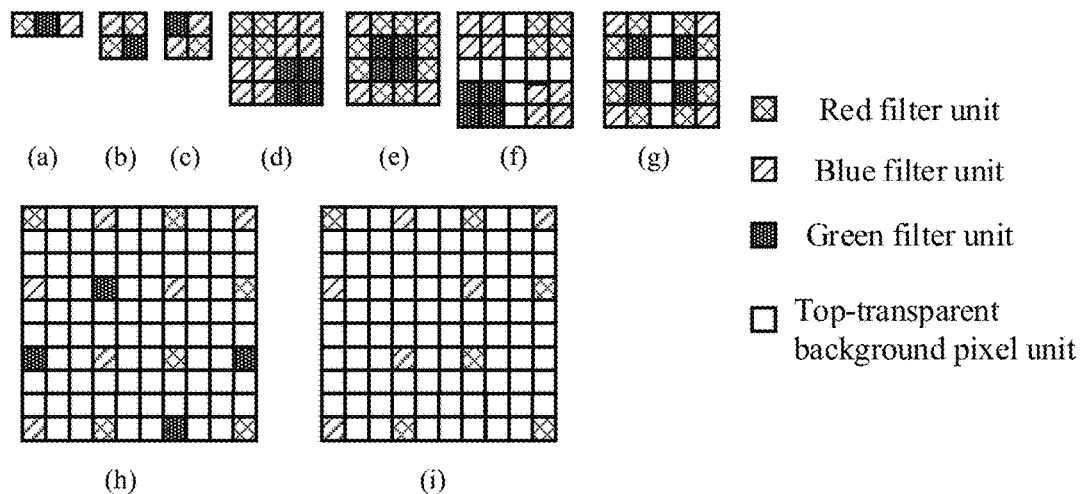
FIG. 6
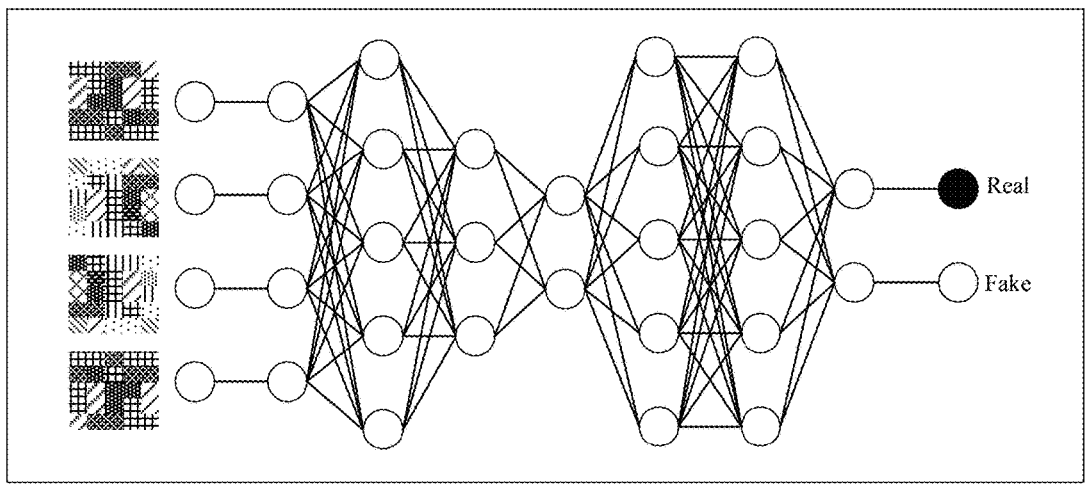
FIG. 7
400
| Capturing a fingerprint image of an object to be identified through a plurality of pixel units of an optical fingerprint sensor, where at least two filter units are disposed above at least two of the plurality of pixel units, each filter unit corresponds to one pixel unit, and the at least two filter units include filter units in at least two colors | S401 |
FIG. 8

FINGERPRINT IDENTIFICATION DEVICE, METHOD AND ELECTRONIC DEVICE

CROSS-REFERENCE TO RELATED APPLICATIONS

The present application is a continuation of international application No. PCT/CN2018/120893, filed on Dec. 13, 2018, which is hereby incorporated by reference in its entirety.

TECHNICAL FIELD

The present application relates to the field of optical fingerprint technologies, and in particular, to a fingerprint identification device, a fingerprint identification method and an electronic device.

BACKGROUND

The application of an optical fingerprint identification device brings safe and convenient user experience to a user, however a forged fingerprint such as a fingerprint mold made of an artificial material (for example, silica gel, white glue) and a printed fingerprint image is a potential security hazard in fingerprint application. Therefore, how to identify authenticity of a fingerprint to improve security of fingerprint identification is an urgent problem to be solved.

SUMMARY

Embodiments of the present application provide a fingerprint identification device, a fingerprint identification method and an electronic device, which could identify authenticity of a fingerprint, thereby improving security of fingerprint identification.

In a first aspect, provided is a fingerprint identification device, including an optical fingerprint sensor including a plurality of pixel units; at least two filter units disposed above at least two pixel units of the plurality of pixel units, where each filter unit corresponds to one pixel unit, and the at least two filter units include filter units in at least two colors.

In a possible implementation manner, a fingerprint image of an object to be identified captured by the at least two pixel units is used to determine whether the object to be identified is a real finger.

In a possible implementation manner, the at least two filter units include a plurality of first filter units, where a color of the plurality of first filter units is different from a color of a filter layer disposed above other pixel units except the at least two pixel units in the plurality of pixel units, or no filter layer is disposed above the other pixel units.

In a possible implementation manner, a ratio of a number of the plurality of first filter units to a total number of the plurality of pixel units is less than a first threshold.

In a possible implementation manner, the first threshold is 5%.

In a possible implementation manner, a number of consecutive filter units in the plurality of first filter units is less than a second threshold.

In a possible implementation manner, the second threshold is 8.

In a possible implementation manner, the at least two filter units constitute at least one filter unit group, each filter unit group includes at least two filter units, and adjacent filter units in the filter unit group include filter units in at least two colors.

In a possible implementation manner, if a green filter layer is disposed above other pixel units except the at least two pixel units in the plurality of pixel units, the adjacent filter units in the filter unit group include a red filter unit and a blue filter unit exclusively; or if no filter layer is disposed above the other pixel units, the adjacent filter units in the filter unit group include at least two of a red filter unit, a green filter unit and a blue filter unit.

In a possible implementation manner, a wave band range of each of the at least two filter units includes a part of a wave band range of an optical signal for fingerprint detection exclusively.

Optionally, the at least two filter units constitute a plurality of filter unit groups, and the plurality of filter unit groups are discretely distributed in a pixel array constituted by the plurality of pixel units.

Optionally, the plurality of filter unit groups are evenly distributed in a pixel array of the optical fingerprint sensor in rectangle, square, rhombus or circle.

Optionally, the filter unit is a color filter material, and the color filter material includes at least one of a red filter material, a green filter material, and a blue filter material.

Optionally, the filter unit is a color filter plate, and the color filter plate is one of a red filter plate, a green filter plate and a blue filter plate.

Optionally, the fingerprint identification device further includes a processor configured to process, through a deep learning network, a fingerprint image of an object to be identified captured by the at least two pixel units to determine whether the object to be identified is a real finger.

Optionally, a processor is further configured to extract, from fingerprint images of a plurality of real fingers and fake fingerprints captured by the optical fingerprint sensor, sample values of the pixel units corresponding to the filter units in each fingerprint image, and recombine the sample values to obtain a color fingerprint image; and input the color fingerprint image into a deep learning network for training to obtain a model and a parameter of the deep learning network.

Optionally, a processor is further configured to perform fingerprint identification according to a fingerprint image captured by other pixel units except the at least two pixel units in the plurality of pixel units.

In a second aspect, provided is a fingerprint identification method including capturing a fingerprint image of an object to be identified through a plurality of pixel units of an optical fingerprint sensor, where at least two filter units are disposed above at least two pixel units of the plurality of pixel units, each filter unit corresponds to one pixel unit, and the at least two filter units include filter units in at least two colors.

Optionally, the method includes determining, according to a fingerprint image of the object to be identified captured by the at least two pixel units, whether the object to be identified is a real finger.

Optionally, the determining, according to the fingerprint image of the object to be identified captured by the at least two pixel units, whether the object to be identified is the real finger includes processing, through a deep learning network, the fingerprint image of the object to be identified captured by the at least two pixel units to determine whether the object to be identified is the real finger.

Optionally, the method further includes: capturing fingerprint images of a plurality of real fingers and fake fingers through the optical fingerprint sensor; extracting sample values of the pixel units corresponding to the filter units in each fingerprint image, and recombining the sample values to obtain a color fingerprint image; and inputting the color fingerprint image into the deep learning network for training to obtain a model and a parameter of the deep learning network.

Optionally, the method further includes performing fingerprint identification according to a fingerprint image captured by other pixel units except the at least two pixel units in the plurality of pixel units.

Optionally, the at least two filter units include a plurality of first filter units, where a color of the plurality of first filter units is different from a color of a filter layer disposed above other pixel units except the at least two pixel units in the plurality of pixel units, or no filter layer is disposed above the other pixel units.

Optionally, a ratio of a number of the plurality of first filter units to a total number of the plurality of pixel units is less than a first threshold. Optionally, the first threshold is 5%.

Optionally, a number of consecutive filter units in the plurality of first filter units is less than a second threshold. Optionally, the second threshold is 8.

Optionally, the at least two filter units constitute at least one filter unit group, each filter unit group includes at least two filter units, and adjacent filter units in the filter unit group include filter units in at least two colors.

Optionally, if a green filter layer is disposed above other pixel units except the at least two pixel units in the plurality of pixel units, the adjacent filter units in the filter unit group include a red filter unit and a blue filter unit exclusively; or if no filter layer is disposed above the other pixel units, the adjacent filter units in the filter unit group include at least two of a red filter unit, a green filter unit and a blue filter unit.

Optionally, a wave band range of each of the at least two filter units includes a part of a wave band range of an optical signal for fingerprint detection exclusively.

In a possible implementation manner, the at least two filter units constitute a plurality of filter unit groups, and the plurality of filter unit groups are discretely distributed in a pixel array constituted by the plurality of pixel units.

In a possible implementation manner, the plurality of filter unit groups are evenly distributed in a pixel array of the optical fingerprint sensor in rectangle, square, rhombus or circle.

In a possible implementation manner, the filter unit is a color filter material, and the color filter material includes at least one of a red filter material, a green filter material, and a blue filter material.

Optionally, the filter unit is a color filter plate, and the color filter plate is one of a red filter plate, a green filter plate and a blue filter plate.

In a third aspect, provided is a chip including an input and output interface, at least one processor, at least one memory and a bus, where the at least one memory is configured to store an instruction, the at least one processor is configured to call an instruction in the at least one memory to execute the method in the second aspect or any possible implementation manner of the second aspect.

In a fourth aspect, provided is an electronic device including the fingerprint identification device in the first aspect or any possible implementation manner of the first aspect.

In a fifth aspect, provided is a computer readable medium configured to store a computer program, where the computer program includes an instruction used to execute the method in the second aspect or any possible implementation manner of the second aspect.

In a sixth aspect, provided is a computer program product including an instruction that when a computer runs the instruction of the computer program product, the computer executes the fingerprint identification method in the forgoing second aspect or any possible implementation manner of the second aspect.

Specifically, the computer program product may be run on the electronic device of the foregoing fourth aspect.

According to the foregoing technical solution, filter units in at least two colors are disposed above a part of a plurality of pixel units of an optical fingerprint sensor, so that a fingerprint image captured by said part of the pixel units is a color fingerprint image; and since the color fingerprint image has significant differences for different materials, authenticity of the fingerprint image can be determined according to the color fingerprint image, and thus security of fingerprint identification could be improved.

BRIEF DESCRIPTION OF DRAWINGS

FIG. 6 is a schematic diagram of another design manner of filter units in a filter unit group.

FIG. 7 is a structural diagram of a convolutional neural network according to an embodiment of the present application.

FIG. 8 is a schematic flowchart of a fingerprint identification method according to an embodiment of the present application.

DESCRIPTION OF EMBODIMENTS

Technical solutions in embodiments of the present application will be described hereinafter in conjunction with the attached drawings.

It should be understood that embodiments of the present application may be applied to an optical fingerprint system, including but not limited to an optical fingerprint identification system and a medical diagnostic product based on optical fingerprint imaging. The embodiments of the present application are only described by taking an optical fingerprint system as an example, which should not constitute any limitation to the embodiments of the present application, and the embodiments of the present application are also applicable to other systems using an optical imaging technology or the like.

As a common application scenario, the optical fingerprint system provided in an embodiment of the present application may be applied to a smart phone, a tablet computer, and other mobile terminals having a display screen or other terminal devices. More specifically, in the foregoing terminal device, a fingerprint identification device may be specifically an optical fingerprint device, which may be disposed in a partial region or an entire region under a display screen, thereby forming an under-display optical fingerprint system. Alternatively, the fingerprint identification device may be partially or entirely integrated into the interior of the display screen of the terminal device to form an in-display optical fingerprint system.

Figure 1:
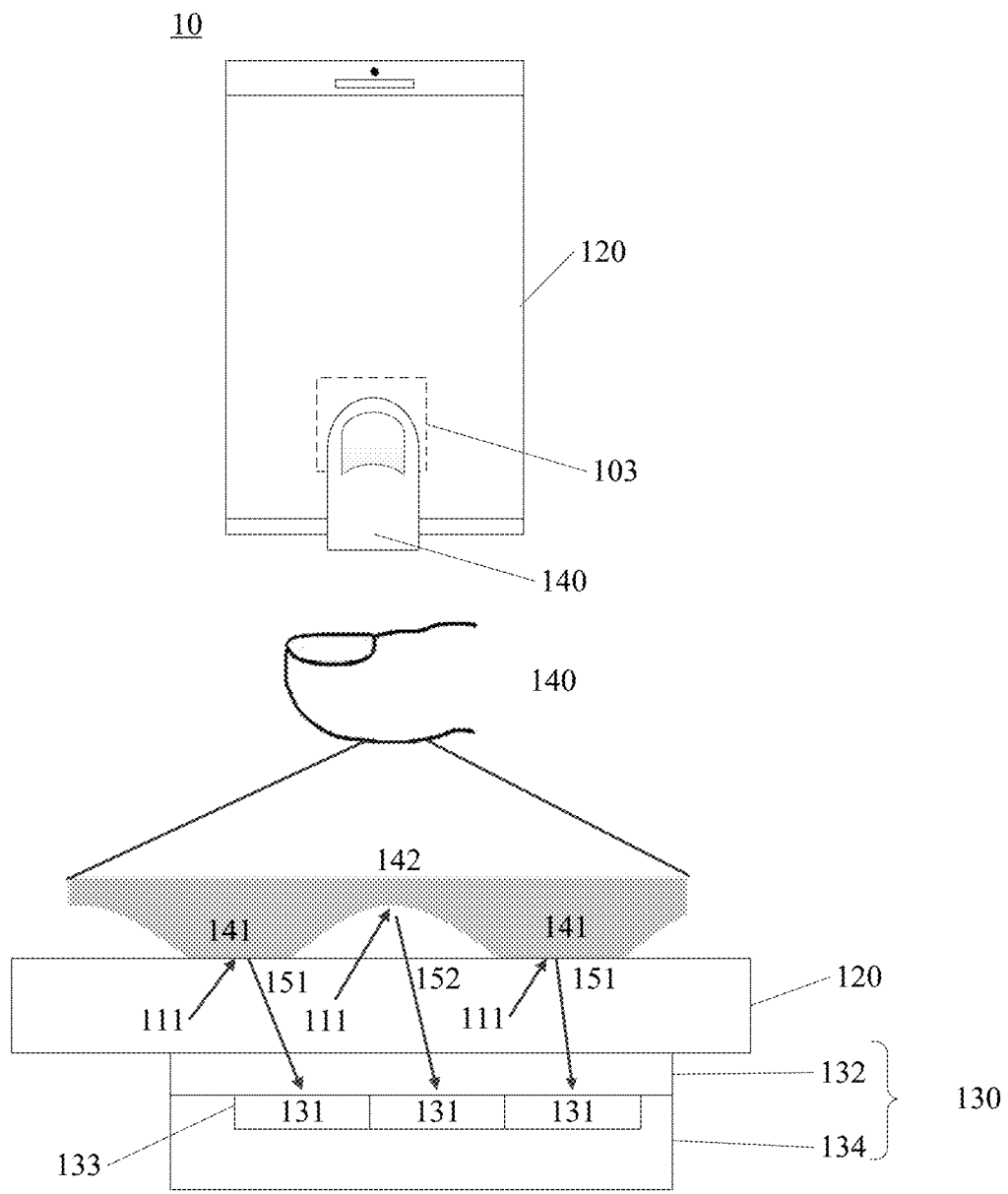
FIG. 1 is a schematic structural diagram of an electronic device applicable to an embodiment of the present application.

FIG. 1 is a schematic structural diagram of a terminal device applicable to an embodiment of the present application. A terminal device 10 includes a display screen 120 and an optical fingerprint device 130, where the optical fingerprint device 130 is disposed in a partial region under the display screen 120. The optical fingerprint device 130 includes an optical fingerprint sensor including a sensing array 133 having a plurality of optical sensing units 131, and a region where the sensing array 133 is located or its sensing region is a fingerprint detecting region 103 of the optical fingerprint device 130. As shown in FIG. 1, the fingerprint detecting region 103 is located within a display region of the display screen 120. In an alternative embodiment, the optical fingerprint device 130 may also be disposed at other positions, such as a side of the display screen 120 or an edge non-light transmitting region of the terminal device 10, and a light signal of at least part of the display region of the display screen 120 is directed to the optical fingerprint device 130 through a light path design, such that the fingerprint detecting region 103 is actually located in the display region of the display screen 120.

It should be understood that an area of the fingerprint detecting region 103 may be different from an area of the sensing array of the optical fingerprint device 130. For example, the area of the fingerprint detecting region 103 of the optical fingerprint device 130 may be larger than the area of the sensing array of the optical fingerprint device 130 through for example, a lens imaging light path design, a reflective folding light path design or other light path designs such as light convergence or reflection. In other alternative implementation manners, if the light path is directed in a manner of, for example, light collimation, the area of the fingerprint detecting region 103 of the optical fingerprint device 130 may also be designed to be substantially identical with the area of the sensing array of the optical fingerprint device 130.

Therefore, when a user needs to unlock the terminal device or perform other fingerprint verification, a fingerprint input may be implemented merely by pressing a finger on the fingerprint detecting region 103 located on the display screen 120. Since fingerprint detection may be implemented in the screen, there is no need to exclusively reserve space for a front surface of the terminal device 10 adopting the foregoing structure to set a fingerprint button (such as a Home button), so that a full screen solution may be adopted; that is, the display region of the display screen 120 may be substantially extended to an entire front surface of the terminal device 10.

As an alternative implementation manner, as shown in FIG. 1, the optical fingerprint device 130 includes a light detecting portion 134 and an optical component 132. The light detecting portion 134 includes the sensing array, a readout circuit and other auxiliary circuits electrically connected to the sensing array, which is fabricated in a die by a semiconductor process such as an optical imaging chip or an optical fingerprint sensor; the sensing array is specifically a photo detector array including a plurality of photo detectors distributed in an array, and the photo detectors may be used as the optical sensing unit as described above. The optical component 132 may be disposed above the sensing array of the light detecting portion 134, and may specifically include a filter layer, a light directing layer or a light path directing structure, and other optical elements, the filter layer may be used to filter ambient light passing through a finger, and the light directing layer or light path directing structure is mainly used to direct reflected light reflected from a finger surface to the sensing array for optical detection.

In a specific implementation, the optical component 132 and the light detecting portion 134 may be encapsulated in the same optical fingerprint member. For example, the optical component 132 and the light detecting portion 134 may be encapsulated in the same optical fingerprint chip, or the optical component 132 may be disposed outside a chip where the light detecting portion 134 is located, for example, the optical component 132 is attached above the chip, or a part of elements of the optical component 132 are integrated into the chip.

There are various implementations for the light directing layer or light path directing structure of the optical component 132, for example, the light directing layer may be specifically a collimator layer fabricated on a semiconductor silicon wafer, which has a plurality of collimating units or micro-pore arrays, and the collimating unit may be a hole. Light in the reflected light reflected from the finger that is vertically incident to the collimating unit may pass through the collimating unit and be received by the optical sensing unit below it. However, light with an excessive large incident angle is attenuated through multiple reflection inside the collimating unit, therefore, each optical sensing unit may basically only receive the reflected light reflected from a fingerprint pattern right above the optical sensing unit, and thus the sensing array may detect a fingerprint image of the finger.

In another embodiment, the light directing layer or the light path directing structure may also be an optical lens layer having one or more lens units, for example, a lens group composed of one or more aspheric lenses, for converging reflected light reflected from the finger to the sensing array of the light detecting portion 134 below it, so that the sensing array may perform imaging based on the reflected light so as to obtain the fingerprint image of the finger. Optionally, an optical lens layer may be provided with a pinhole in the light path of the lens unit, and the pinhole may cooperate with the optical lens layer to expand the field of view of the optical fingerprint device, to improve a fingerprint imaging effect of the optical fingerprint device 130.

In other embodiments, the light directing layer or the light path directing structure may also specifically adopt a micro-lens layer having a micro-lens array constituted by a plurality of micro-lenses, which may be formed above the sensing array of the light detecting portion 134 by a semiconductor growth process or other processes, and each micro-lens may correspond to one of the sensing units in the sensing array respectively. Furthermore, other optical film layers such as a dielectric layer or a passivation layer, may be formed between the micro-lens layer and the sensing unit, and more specifically, a light blocking layer having a micro-pore may also be formed between the micro-lens layer and the sensing unit, where the micro-pore is formed between the corresponding micro-lens and the sensing unit, and the light blocking layer may block optical interference between adjacent micro-lenses and the sensing units, such that light corresponding to the sensing unit is converged to the interior of the micro-pore through the micro-lens and is transmitted to the sensing unit via the micro-pore to perform optical fingerprint imaging. It should be understood that several implementations of the forgoing light path directing structure may be used alone or in combination, for example, a micro-lens layer may be further disposed under the collimator layer or the optical lens layer. Certainly, when the collimator layer or the optical lens layer is used in combination with the micro-lens layer, the specific laminated structure or light path may require to be adjusted according to actual needs.

As an optional embodiment, the display screen 120 may adopt a display screen with a self-emitting display unit, for example, an organic light-emitting diode (OLED) display screen or a micro light-emitting diode (Micro-LED) display screen. Taking an OLED display screen as an example, the optical fingerprint device 130 may use a display unit (that is, an OLED light source) of the OLED display screen 120 located at the fingerprint detecting region 103 as an excitation light source for optical fingerprint detection. When a finger 140 is pressed against the fingerprint detecting region 103, the display screen 120 emits a beam of light 111 to a target finger 140 above the fingerprint detecting region 103, and the light 111 is reflected by a surface of the finger 140 to form reflected light or form scattered light after scattering inside the finger 140. In related patent applications, the reflected light and scattered light are collectively referred to as reflected light for convenience of description. Since a ridge and a valley of a fingerprint have different light reflecting capabilities, reflected light 151 from the ridge of the fingerprint and the reflected light 152 from the valley of the fingerprint have different light intensities. After passing through the optical component 132, the reflected light is received by the sensing array 133 in the optical fingerprint device 130 and converted into corresponding electrical signal, that is, a fingerprint detecting signal; and fingerprint image data may be obtained based on the fingerprint detecting signal, and fingerprint matching verification may be further performed, thereby implementing an optical fingerprint identification function at the terminal device 10.

In other embodiments, the optical fingerprint device 130 may also use an internal light source or an external light source to provide a light signal for fingerprint detection. In this case, the optical fingerprint device 130 may be applied to a non-self-emitting display screen, such as a liquid crystal display screen or other passive light-emitting display screens. Taking a liquid crystal display screen having a backlight module and a liquid crystal panel as an example, in order to support under-screen fingerprint detection of the liquid crystal display screen, the optical fingerprint system of the terminal device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the terminal device 10. The optical fingerprint device 130 may be disposed under the liquid crystal panel or the edge region of the protective cover, and by being directed over a light path, light for fingerprint detection may reach the optical fingerprint device 130. Alternatively, the optical fingerprint device 130 may also be disposed under the backlight module, and the backlight module allows the light for fingerprint detection to pass through the liquid crystal panel and the backlight module and reach the optical fingerprint device 130 by providing a via hole on film layers such as a diffusion sheet, a brightening sheet, a reflection sheet or the like, or by performing other optical designs. When the optical fingerprint device 130 uses an internal light source or an external light source to provide a light signal for fingerprint detection, a detection principle is consistent with the foregoing description.

It should be understood that, in a specific implementation, the terminal device 10 further includes a transparent protective cover; the cover may be a glass cover or a sapphire cover, which is located above the display screen 120 and covers a front surface of the terminal device 10. Therefore, in an embodiment of the present application, the so-called the finger being pressed against the display screen 120 actually refers to the finger being pressed against the cover 110 above the display screen 120 or a surface of the protective layer covering the cover 110.

On the other hand, in some embodiments, the optical fingerprint device 130 may only include one optical fingerprint sensor, and in this case, the fingerprint detecting region 103 of the optical fingerprint device 130 has a smaller area and a fixed position, and therefore, when an fingerprint input is performed, the user needs to press the finger at a specific position of the fingerprint detecting region 103, otherwise the optical fingerprint device 130 may not be able to capture the fingerprint image, thereby resulting in poor user experience. In other alternative embodiments, the optical fingerprint device 130 may specifically include a plurality of optical fingerprint sensors which may be disposed under the display screen 120 side by side in a splicing manner, and sensing regions of the plurality of optical fingerprint sensors collectively constitute the fingerprint detecting region 103 of the optical fingerprint device 130. In other words, the fingerprint detecting region 103 of the optical fingerprint device 130 may include a plurality of sub-regions, each sub-region corresponding to a sensing region of one of the optical fingerprint sensors, so that the fingerprint capturing region 103 of the optical fingerprint module 130 may be extended to a main region of a lower portion of the display screen, that is, it is extended to a generally pressed region by the finger, thereby achieving a blind pressing type of a fingerprint input operation. Alternatively, when the number of the optical fingerprint sensors is sufficient, the fingerprint detecting region 130 may also be extended to a half of the display region or even the entire display region, thereby achieving half-screen or full-screen fingerprint detection.

It should also be understood that in the embodiment of the present application, the sensing array in the optical fingerprint device may also be referred to as a pixel array, and the optical sensing unit or sensing unit in the sensing array may also be referred to as a pixel unit.

It should be noted that the optical fingerprint device in the embodiment of the present application may also be referred to as an optical fingerprint identifying module, a fingerprint identification device, a fingerprint identifying module, a fingerprint module, a fingerprint capturing device, or the like, and the foregoing terms may be replaced with each other.

Generally speaking, influenced by factors of a thickness of a skin layer, hemoglobin concentration, melanin content and the like of a human skin tissue, reflection performance of the human skin tissue to a specific wavelength of light such as red light is significantly different from that of an artificial material such as silica gel, paper and adhesive tape.

Figure 2:
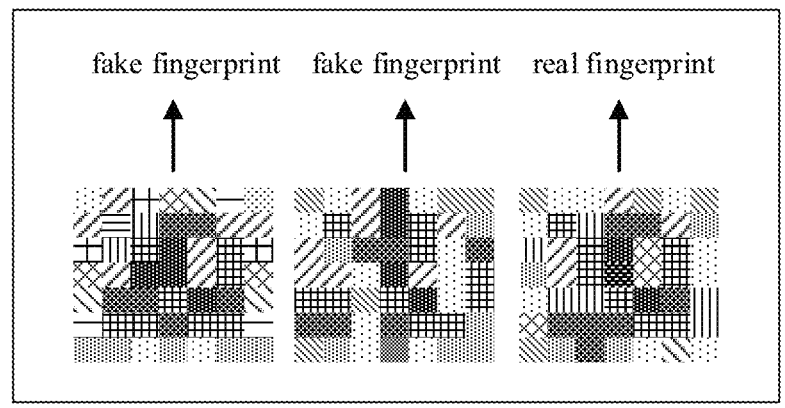
FIG. 2 is a difference comparison diagram of color fingerprint images corresponding to real and fake fingerprints.

Based on this, the present application provides a fingerprint identifying solution, where filter units in at least two colors are disposed above a part of pixel units (denoted as characteristic pixel units) in the fingerprint identification device, so that a fingerprint image captured by the characteristic pixel units is a low-resolution color fingerprint image. For different materials (for example, a human finger and an artificial material such as silica gel), the low-resolution color fingerprint image has significantly different characteristics, as shown in FIG. 2. Therefore, authenticity of a fingerprint image may be determined according to the differences of the low-resolution color fingerprint image captured by the characteristic pixel units.

Hereinafter, the fingerprint identification device according to an embodiment of the present application will be described in detail with reference to FIGS. 3 to 10.

It should be noted that in embodiments illustrated below, the same structure is denoted by the same reference numeral for ease of understanding, and detailed description of the same structure is omitted for brevity.

It should be understood that the number and arrangement manners of pixel units, filter units, and filter unit groups in embodiments of the present application shown below are merely illustrative and should not constitute any limitation to the present application.

Figure 3:
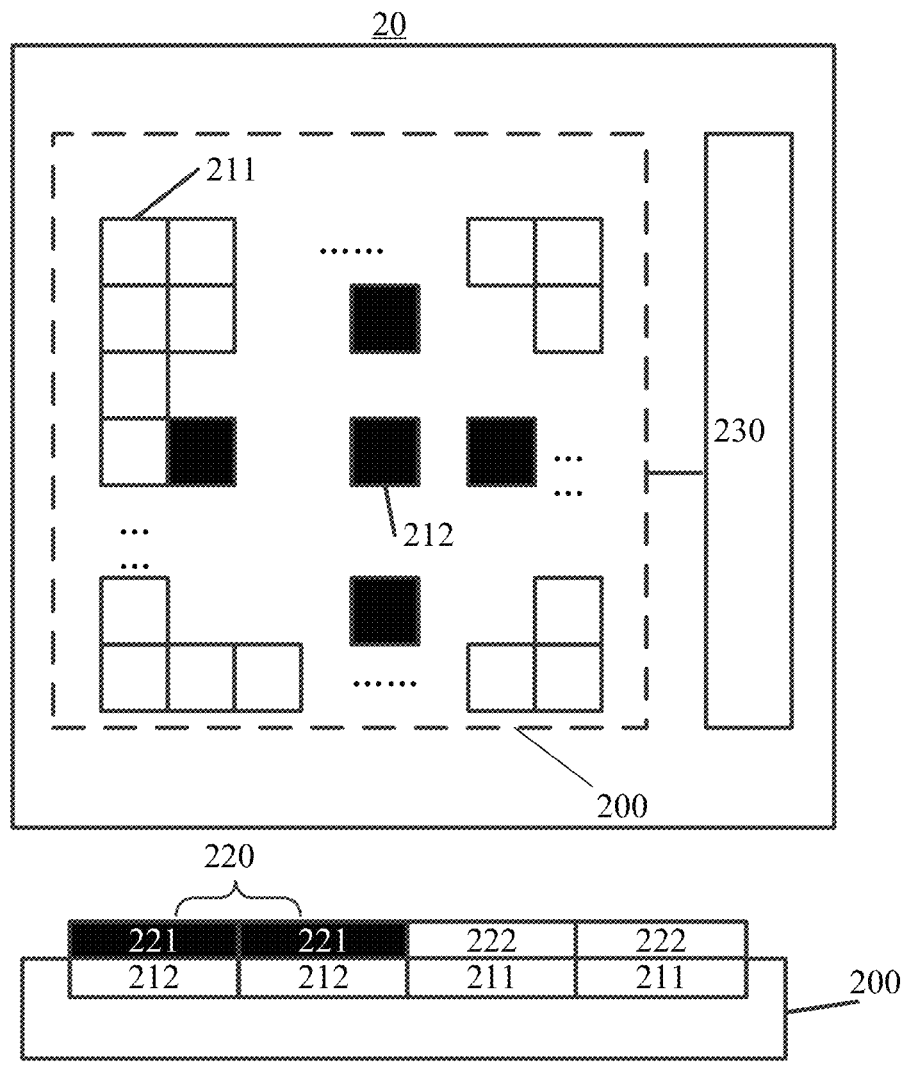
FIG. 3 is a schematic structural diagram of a fingerprint identification device according to an embodiment of the present application.

FIG. 3 is a schematic structural diagram of a fingerprint identification device 20 provided in an embodiment of the present application, the fingerprint identification device 20 includes an optical fingerprint sensor 200 including a plurality of pixel units, for example, a pixel unit 211 and a pixel unit 212 in FIG. 3; and at least two filter units 221 disposed above at least two pixel units 212 of the plurality of pixel units, where each filter unit 221 corresponds to one pixel unit 212, and the at least two filter units 221 include filter units in at least two colors.

Alternatively, in the embodiment of the present application, the fingerprint identification device may be a fingerprint module, or the fingerprint identification device may be an electronic device including a fingerprint module, which is not limited in the embodiment of the present application.

It should be understood that in the embodiment of the present application, the at least two filter units 221 may constitute at least one filter unit group 220, and a design manner of the filter units in each filter unit group and arrangement manner of the at least one filter unit group in the optical fingerprint sensor will be described in detail below.

For convenience of distinction and illustration, in the embodiment of the present application, a pixel unit provided with the filter unit 221 above, that is, the pixel unit 212 in FIG. 3, is denoted as a characteristic pixel unit; other pixel units except the at least two pixel units, that is, the pixel unit 211 in FIG. 3, are denoted as an ordinary pixel unit, or a background pixel unit. It should be understood that positions, number and distribution situations of the characteristic pixel units 212 and the background pixel units 211 in FIG. 3 are only examples, but should not constitute any limitation to the embodiments of the present application.

In the embodiment of the present application, when the fingerprint image is captured, the fingerprint detecting region of the display screen may display a light spot in a particular color such as a white light spot or a cyan light spot, and when an object to be identified is pressed against the fingerprint detecting region, the light signal corresponding to the light spot may be reflected by the surface of the object to be identified to form a fingerprint detecting signal. Since at least two filter units 221 are disposed above at least two characteristic pixel units 212 and include filter units in at least two colors, after the fingerprint detecting signal passes through the filter units 221 in at least two colors, the at least two characteristic pixel units 212 has captured a color fingerprint image having at least two colors. Moreover, after the fingerprint detecting signal passes through the filter units 221, a part of a wave band of the light signal is filtered, and a resolution of the fingerprint image is reduced with respect to the fingerprint image captured by the pixel unit that is not provided with the filter unit. Therefore, the fingerprint image captured by the characteristic pixel unit is a low-resolution color fingerprint image. Further, authenticity of a fingerprint may be determined according to the low-resolution color fingerprint image.

It should be understood that in the embodiment of the present application that, it only needs to capture a fingerprint image for one time instead of capturing the fingerprint image for multiple times, since a color fingerprint image having different colors may be obtained by passing through filter units in different colors, which is beneficial for reducing capture time and improving capture efficiency.

Alternatively, in the embodiment of the present application, a filter unit generally only allows a light signal within a particular wave band range to pass through, for a single filter unit, a wave band range of emitted light of a light source for fingerprint detection needs to include a wave band range of the filter unit and at least part of other wave bands expect said wave band, that is, a wave band of a single filter unit only includes a part of wave bands of the emitted light. In this way, after the emitted light is reflected by the surface of the object to be identified, said emitted light enters the filter unit, and after passing through the filter unit, a part of the light signals is filtered while a part of the light signals are allowed to pass through. Further, imaging is further performed on the characteristic pixel unit, and thus a low-resolution color fingerprint image may be obtained.

For example, if the light source emits white light, that is, a white light spot is displayed at the fingerprint detecting region, the filter unit may be a red filter unit that only allows a wave band of red light to pass through, or may be a blue filter unit that only allows a wave band of blue light to pass through, or may be a cyan filter unit that allows wave bands of both green light and blue light to pass through, and the like, as long as the filter unit may filter the light signals of a part of wave bands while allowing the light signals of other wave bands to pass through, which is not limited in the embodiment of the present application.

As an alternative embodiment, if the filter unit 221 is a red filter unit, the red filter unit may be a red filter material or a red filter plate, that is, a red filter material may be coated above the characteristic pixel unit or a red filter plate may be disposed above the characteristic pixel unit to achieve a purpose of allowing only a wave band of red light to pass through, and implementation manners for filter units in other colors are similar and will not be repeatedly described herein.

For example, a wave band range of a blue filter plate may be a center wave band of 440 nm to 475 nm and an upper cut-off wave band of about 550 nm, and transmittance of blue light is higher than that of green light and red light; a wave band range of a green filter plate may be a center wave band of 520 nm to 550 nm, and upper and lower cut-off wave bands of about 620 nm and 460 nm, and transmittance of green light is higher than that of blue light and red light; and a wave band range of a red filter plate may be a lower cut-off wave band of about 550 nm, and transmittance of red light is higher than that of green light and blue light.

Alternatively, in an embodiment of the present application, the light source for the fingerprint detection may be a self-emitting light source from the display screen, or may be an excitation light source integrated inside the fingerprint identification device or other external excitation light sources, which is not limited in the embodiment of the present application.

In an optional implementation manner, no other structures may be disposed above the background pixel unit 211, or no material is coated; that is, it is transparent above the background pixel unit 211 and no processing is performed on the background pixel unit 211. In other words, there is an air gap between the background pixel unit and the optical component above the background pixel unit.

In another optional implementation manner, a light transmissive material 222 may be disposed above the background pixel unit 211, and in this case, the fingerprint detecting signal entering the background pixel unit 211 is also unaffected or slightly affected.

In other optional implementation manners, the filter layer 222 such as a green filter layer may also be disposed above the background pixel unit 211. Optionally, a green filter material may be coated above the background pixel unit 211, or a green filter plate may be disposed above the background pixel unit 211. In this case, after the fingerprint detecting signal passes through the green filter layer, a fingerprint image captured by the background pixel units 211 is a green fingerprint image, that is, the fingerprint detecting signal whose red wave band and the blue wave band have been filtered, which is beneficial for reducing an influence of an ambient light signal such as infrared light and the like, and thus fingerprint identification performance can be improved.

Hereinafter, a design manner of positions and colors of the at least two filter units in the optical fingerprint sensor 200 will be described with reference to a specific embodiment.

It should be understood that in an embodiment of the present application, the at least two filter units may be consecutive filter units, or some filter units may be consecutive, or the filter units may be discrete, which is not limited in the embodiment of the present application.

Optionally, in the embodiment of the present application, the number of consecutive filter units may be set to be less than or equal to a particular threshold, for example, 6, and correspondingly, the number of consecutive characteristic pixel units is also not greater than the particular threshold, which can avoid the influence on fingerprint identification performance.

Optionally, in some embodiments, the at least two filter units 221 may constitute a plurality of filter unit groups 220, and each filter unit group 220 may include filter units in at least two colors. As an optional embodiment, the plurality of filter unit groups 220 may be discretely distributed at a photosensitive region of the optical fingerprint sensor. Accordingly, it may be considered that the characteristic pixel unit groups corresponding to the filter unit groups are discretely distributed in a pixel array of the optical fingerprint sensor, and thus the influence on fingerprint identification performance can be avoided due to excessive number of pixel units consecutively covered by the filter unit group. It should be understood that a photosensitive region of the optical fingerprint sensor may be understood as a region where the pixel unit of the optical fingerprint sensor is located, or may be referred to as the pixel region.

Figure 4:
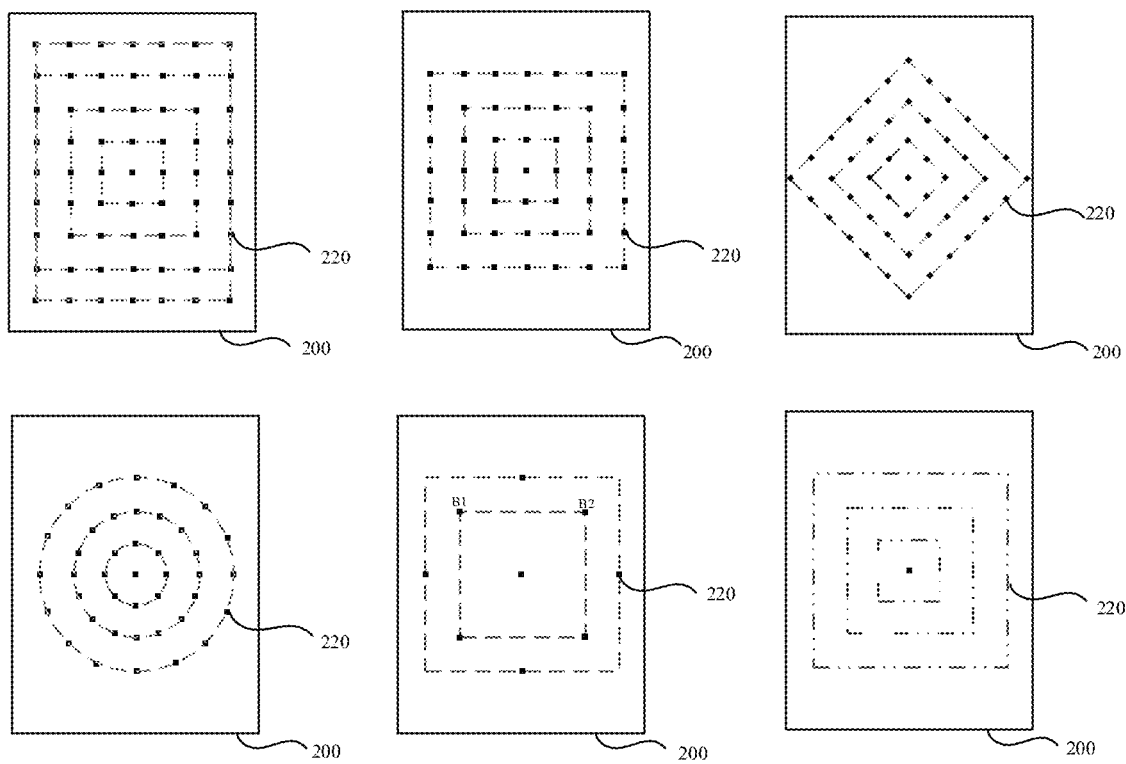
FIG. 4 is a schematic diagram of arrangement manners of filter unit groups according to an embodiment of the present application.

With reference to FIG. 4, several possible implementation manners of filter unit groups 220 in the optical fingerprint sensor will be illustrated.

In one implementation manner, filter unit groups 220 may be disposed in an equally spaced checkerboard manner, for example, a rectangular or square checkerboard pattern as shown in FIG. 4. In this case, the filter unit groups are a filter array M*N, where the M and N may be determined according to the number of rows and the number of columns of the pixel array of the optical fingerprint sensor. Optionally, the M may be M=5, 6, 7, . . . , 32, etc., and the N may be 5, 6, 7, . . . , 32, etc., which is not limited by the embodiment of the present application.

In other optional implementation manners, the filter unit groups 220 may also be arranged in rhombus, circle or other regular or irregular patterns in the photosensitive region of the optical fingerprint sensor, which is not limited in the embodiment of the present application.

It should be understood that FIG. 4 shows several typical arrangement manners of the filter unit groups 221, or preferred arrangement manners, but it should not constitute any limitation to the embodiment of the present application. The embodiment of the present application may also adopt other arrangement manners to set the filter unit groups, as long as it does not affect the fingerprint identification performance or has little influence on the fingerprint identification performance.

Hereinafter, a design manner of filter units in a filter unit group will be described by taking a single filter unit group as an example.

Optionally, in some embodiments, adjacent filter units in the filter unit group at least include a red filter unit and a blue filter unit, and optionally, in some cases, may also include a green filter unit. It should be understood that the adjacent filter units herein may be physically adjacent, or may be spaced apart by one or more background pixel units, which is not limited by the embodiment of the present application.

It can be seen from the forgoing description that, a filter layer may be disposed above the background pixel unit (denoted as a case 1) or it is transparent above the background pixel unit (denoted as a case 2). Hereinafter, a design manner of filter units in a filter unit group will be described in combination with the two cases.

As for case 1, if a filter layer is disposed above a background pixel unit adjacent to the filter units in the filter unit group, the filter unit group may not include the filter unit that has the same color as the filter layer. It is assumed that a green filter layer is disposed above the background pixel unit, the adjacent filter units may only include filter units in red and blue, and thus the influence on fingerprint identification performance can be avoided. Certainly, in this case, a green filter unit may also be included, as long as the number of green filter units does not affect the fingerprint identification performance or has little influence on the fingerprint identification performance.

As for case 2, it is transparent above the background pixel unit adjacent to the filter units in the filter unit group, and in this case, the filter unit adjacent to the background pixel unit may include any two or three of a red filter unit, a blue filter unit, and a green filter unit.

In general, with respect to a wave band of red light and a wave band of blue light, fingerprint identification performance is better by using fingerprint image of a wave band of green light. Therefore, in the embodiment of the present application, when the background pixel unit adopts the fingerprint image of the wave band of green light for fingerprint identification, the green filter unit shall be avoided when setting the filter unit, which can reduce the influence on fingerprint identification performance.

Figure 5:
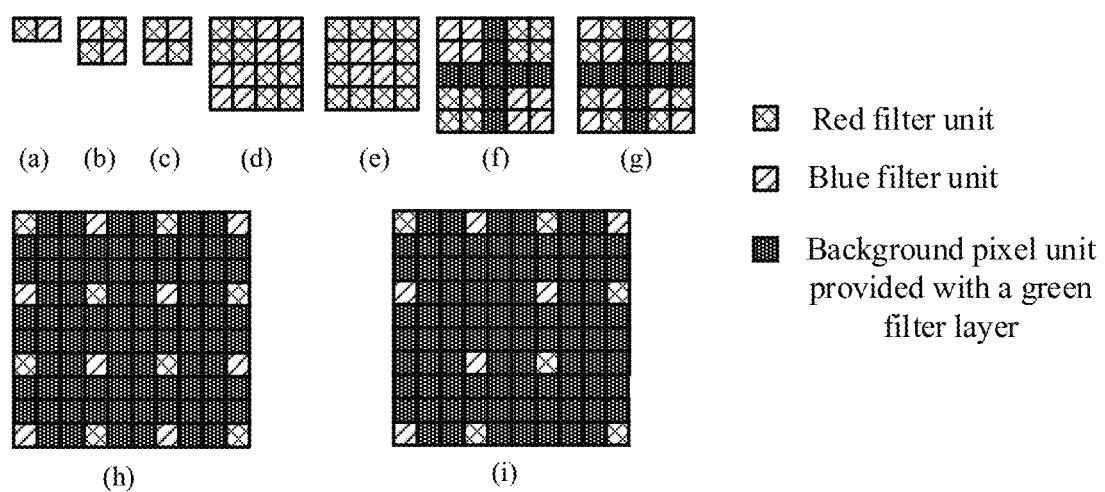
FIG. 5 is a schematic diagram of a design manner of filter units in a filter unit group.

FIGS. 5 and 6 respectively show several design manners of filter units in the filter unit group in the foregoing two cases.

Specifically, FIG. 5 shows several design manners of filter units in a filter unit group when a green filter layer is disposed above a background pixel unit. As shown in FIG. 5, the filter unit group may be a regular array such as 1*2, 2*2, and 4*4 or may be an irregular array. When a green filter layer is disposed above the background pixel unit, that is, a background color is green, the filter unit group may only have filter units in red and blue, and thus the influence on fingerprint identification performance can be avoided.

FIG. 6 shows possible design manners of filter units in a filter unit group when it is transparent above a background pixel unit. As shown in FIG. 6, the filter unit group may also be a regular array such as 1*2, 2*2, and 4*4 or may be an irregular array. When it is transparent above the background pixel unit, that is, when the background is transparent, the filter units in the filter unit group may include filter units in red, blue and green, and certainly may only include filter units in two colors of the foregoing three colors.

It should be understood that in the embodiment of the present application, the filter units in a single filter unit group may be consecutive, such as design manners a to e in FIG. 5 or FIG. 6; or may be partially consecutive, such as design manners f to g in FIG. 5 or FIG. 6, that is, partial filter units are spaced by background pixel units, or the filter units may be discrete, that is, the filter units are all spaced by the background pixel units, such as design manners h to i in FIG. 5 or FIG. 6.

Optionally, in the embodiment of the present application, the fingerprint image captured by the background pixel units may be used for fingerprint matching verification. Due to existence of the characteristic pixel unit, the fingerprint image captured by the background pixel units is not a complete fingerprint image. Therefore, before fingerprint identification is performed, the complete fingerprint image may be recovered according to the fingerprint image captured by the background pixel units, for example, a fingerprint image of the characteristic pixel units may be recovered by interpolation or fitting to obtain the complete fingerprint image.

It can be understood that the more the number of non-background color pixel units, the more missing information of the fingerprint image captured by the background pixel units, which is not conducive to the recovery or restoration of the complete fingerprint image according to the fingerprint image captured by the background pixel units.

It can be also understood that when there is a larger number of consecutive pixel units in the non-background color pixel units, that is, when adjacent background color pixel units are distantly spaced, excessive fingerprint information is lost, which is not conducive to the recovery or restoration of the complete fingerprint image.

Therefore, in the embodiment of the present application, it may be set that the number of non-background color filter units satisfies at least one of the following conditions to reduce the influence on fingerprint identification performance:

1. the number of non-background color filter units is less than a particular threshold, for example, 20;

2. a ratio of the non-background color filter unit to the total number of pixel units in the optical fingerprint sensor is less than a first threshold, for example, 5% or 2%; and 3. the number of consecutive non-background color filter units is less than a second threshold.

Since the non-background color filter unit is one-to-one corresponding to a non-background color pixel unit, in other words, in the embodiment of the present application, it may be set that the number of non-background color pixel units satisfies at least one of the following conditions to reduce the influence on fingerprint identification performance:

1. the number of non-background color pixel units is less than a particular threshold, for example, 20;

2. a ratio of the non-background color pixel unit to the total number of pixel units in the optical fingerprint sensor is less than a first threshold, for example, 5% or 2%; and 3. the number of consecutive non-background color pixel units is less than a second threshold.

It should be understood that in the embodiment of the present application, a color of the non-background color filter unit is different from a color of a filter layer disposed above the background pixel unit, for example, the non-background color filter unit is a red filter unit, or it is transparent above the background pixel unit.

Correspondingly, a color of the filter unit disposed above the non-background color pixel unit is different from a color of the filter layer disposed above the background pixel unit, for example, a red filter unit is disposed above the non-background color pixel unit, a green filter layer is disposed above the background pixel unit, or no filter layer is disposed above the background pixel unit.

It should be understood that in the embodiment of the present application, the second threshold may be the number of consecutive pixel units in the horizontal direction, for example, 6, or may be the number of consecutive pixel units in the vertical direction, for example, 6, or may be the number of consecutive pixel units in the horizontal direction and the number of consecutive pixel units in the vertical direction, that is, an area of consecutive pixel units, for example, 6*6, which is not limited in the embodiment of the present application.

It should be noted that in the embodiment of the present application, colors and positions of the filter units in each of the plurality of filter unit groups may be set in the same way, or colors and/or positions of one or more filter units in a certain or several filter unit groups may be changed, that is, colors and/or positions of the filter units in the filter unit group may be partially adjusted, so long as the fingerprint identification performance is not affected, which is not limited by the embodiment of the present application.

Optionally, in the embodiment of the present application, the fingerprint identification device 20 may further include a processor 230 configured to determine, according to the fingerprint image captured by the at least two pixel units, whether the fingerprint image is from a real finger.

Specifically, the plurality of pixel units of the optical fingerprint sensor may perform imaging on the fingerprint detecting signal reflected from the surface of the object to be identified. Further, the processor may extract and recombine the fingerprint image captured by the characteristic pixel units of the plurality of pixel units to obtain a low-resolution color fingerprint image, and then the processor 230 may input the low-resolution color fingerprint image to a deep learning network that has been successfully trained, and process the color fingerprint image through the deep learning network to determine whether the color fingerprint image is from a real finger.

Optionally, in the embodiment of the present application, the processor 230 may be a processor in a fingerprint module such as a micro control unit (MCU), or may also be a processor in an electronic device such as a host module, which is not limited in the embodiment of the present application.

Optionally, in the embodiment of the present application, the deep learning network may be a convolutional neural network or other deep learning networks, which is not limited by the embodiment of the present application. Hereinafter, a convolutional neural network is taken an example to illustrate a specific training process.

First, a convolutional neural network structure is constructed, for example, a two-layer convolutional neural network as shown in FIG. 7, or a three-layer network structure or more layers of network structures may be adopted, and constitution of each layer of convolution network structure may also be adjusted according to fingerprint information to be extracted, which is not limited in the embodiment of the present application.

Second, an initial training parameter and convergence condition of the convolutional neural network are set.

Optionally, in the embodiment of the present application, the initial training parameter may be randomly generated, or acquired according to empirical values, or may be a parameter of a convolutional neural network model pre-trained according to a large amount of real and fake fingerprint data, which is not limited in the embodiment of the present application.

Optionally, in an embodiment of the present application, convergence conditions may include at least one of the following:

1. a probability of determining a color fingerprint image of a real finger to be a fingerprint image of a real finger is greater than a first probability, for example, 98%;

2. a probability of determining a color fingerprint image of a fake finger to be a fingerprint image of a fake finger is greater than a second probability, for example 95%;

3. a probability of determining a color fingerprint image of a real finger as a fingerprint image of a fake finger is less than a third probability, for example, 2%; and 4. a probability of determining a color fingerprint image of a fake finger to be a fingerprint image of a real finger is less than a fourth probability, for example, 3%;

Then, a large number of color fingerprint images of real fingers and fake fingers are input to the convolutional neural network, and the convolutional neural network may process the foregoing color fingerprint image based on the initial training parameter to determine a determination result for each color fingerprint image. Further, according to the determination result, the structure of convolutional neural network and/or the training parameter of each layer are adjusted until the determination result satisfies the convergence conditions.

Hereinafter, other color fingerprint images captured by the characteristic pixel units may be input to the convolutional neural network, so that the convolutional neural network may process the color fingerprint image using the training parameter to determine whether the color fingerprint image is from a real finger.

Optionally, in the embodiment of the present application, the processor 230 may further determine whether the object to be identified is a real finger if a fingerprint image captured by the background pixel units matches a registered fingerprint template of the object to be identified, further determine whether the object to be identified is a real finger. If the object to be identified is a real finger, fingerprint authentication is determined to be successful, thereby executing an operation of triggering the fingerprint identification, for example, an operation of terminal unlocking or payment.

Optionally, in the embodiment of the present application, the processor 230 may also determine, if the object to be identified is a real finger, whether a fingerprint image captured by the background pixel units matches a registered fingerprint template of the object to be identified, and if matched, fingerprint authentication is determined to be successful and further an operation of triggering the fingerprint identification is executed, for example, an operation of terminal unlocking or payment.

Optionally, in the embodiment of the present application, the fingerprint identification device 200 may further include an optical component, which may corresponds to the optical component 132 in FIG. 1 and will not be repeatedly described here.

A device embodiment of the present application is described in detail with reference to FIGS. 3 to 7, and a method embodiment of the present application is described in detail below with reference to FIG. 8. It should be understood that the method embodiment corresponds to the device embodiment, and therefore similar description may refer to the device embodiment.

FIG. 8 is a schematic flowchart of a fingerprint identification method according to an embodiment of the present application. It should be understood that a method 400 may be applied to the fingerprint identification device 20 shown in FIG. 3. As shown in FIG. 8, the method 400 includes S401, capturing a fingerprint image of an object to be identified through a plurality of pixel units of an optical fingerprint sensor, where at least two filter units are disposed above at least two pixel units of the plurality of pixel units, each filter unit corresponds to one pixel unit, and the at least two filter units include filter units in at least two colors.

Optionally, the method 400 may be executed by a processor in the fingerprint identification device such as a micro control unit MCU) in a fingerprint module, or may also be executed by a processor in an electronic device, such as a host module, which is not limited by the embodiments of the present application.

Optionally, in some embodiments, the method 400 may further include determining, according to a fingerprint image of an object to be identified captured by the at least two pixel units, whether the object to be identified is a real finger.

Optionally, in some embodiments, determining, according to the fingerprint image of the object to be identified captured by the at least two pixel units, whether the object to be identified is the real finger includes processing, through a deep learning network, the fingerprint image of the object to be identified captured by the at least two pixel units to determine whether the object to be identified is a real finger.

Optionally, in some embodiments, the method further includes capturing fingerprint images of a plurality of real fingers and fake fingers through the optical fingerprint sensor; extracting sample values of the pixel units corresponding to the filter units in each fingerprint image, and recombining the sample values to obtain a color fingerprint image; and inputting the color fingerprint image into a deep learning network for training to obtain a model and a parameter of the deep learning network.

Optionally, in some embodiments, the method further includes performing fingerprint identification according to a fingerprint image captured by other pixel units except the at least two pixel units in the plurality of pixel units.

Optionally, in the embodiment of the present application, first, whether the object to be identified is a real finger may be determined, and then if the object to be identified is a real finger, whether fingerprint information of the object to be identified matches recorded fingerprint information of the object to be identified may be determined, and if the foregoing two conditions are satisfied at the same time, fingerprint authentication is determined to be successful, and an operation of triggering the fingerprint identification is further executed, for example, an operation of terminal unlocking or payment.

Alternatively, it is also possible to first determine whether the fingerprint information of the object to be identified matches the recorded fingerprint information of the object to be identified, further determine whether the object to be identified is a real finger if fingerprint matching succeeds; and then if the object to be identified is a real finger, fingerprint authentication is determined to be successful and further an operation of triggering the fingerprint identification is executed, for example, an operation of terminal unlocking or payment.

Optionally, in some embodiments, the at least two filter units include a plurality of first filter units, where a color of the plurality of first filter units is different from a color of a filter layer disposed above other pixel units except the at least two pixel units in the plurality of pixel units, or no filter layer is disposed above the other pixel units.

Optionally, in some embodiments, a ratio of the number of the plurality of first filter units to a total number of the plurality of pixel units is less than a first threshold.

Optionally, in some embodiments, the first threshold is 5%.

Optionally, in some embodiments, the number of consecutive filter units in the plurality of first filter units is less than a second threshold.

Optionally, in some embodiments, the second threshold is 8.

Optionally, in some embodiments, the at least two filter units constitute at least one filter unit group, each filter unit group includes at least two filter units, and adjacent filter units in the filter unit group include filter units in at least two colors.

Optionally, in some embodiments, if a green filter layer is disposed above other pixel units except the at least two pixel units in the plurality of pixel units, the adjacent filter units in the filter unit group include a red filter unit and a blue filter unit exclusively; or if no filter layer is disposed above the other pixel units, the adjacent filter units in the filter unit group include at least two of a red filter unit, a green filter unit and a blue filter unit.

Optionally, in some embodiments, a wave band range of each of the at least two filter units includes a part of a wave band range of a light signal for fingerprint detection exclusively.

Optionally, in some embodiments, the at least two filter units constitute a plurality of filter unit groups, and the plurality of filter unit groups are discretely distributed in a pixel array constituted by the plurality of pixel units.

Optionally, in some embodiments, the plurality of filter unit groups are evenly distributed in a pixel array of the optical fingerprint sensor in rectangle, square, rhombus or circle.

Optionally, in some embodiments, the filter unit is a color filter material, and the color filter material includes at least one of a red filter material, a green filter material, and a blue filter material.

Optionally, in some embodiments, the filter unit is a color filter plate, and the color filter plate is one of a red filter plate, a green filter plate and a blue filter plate.

Figure 9:
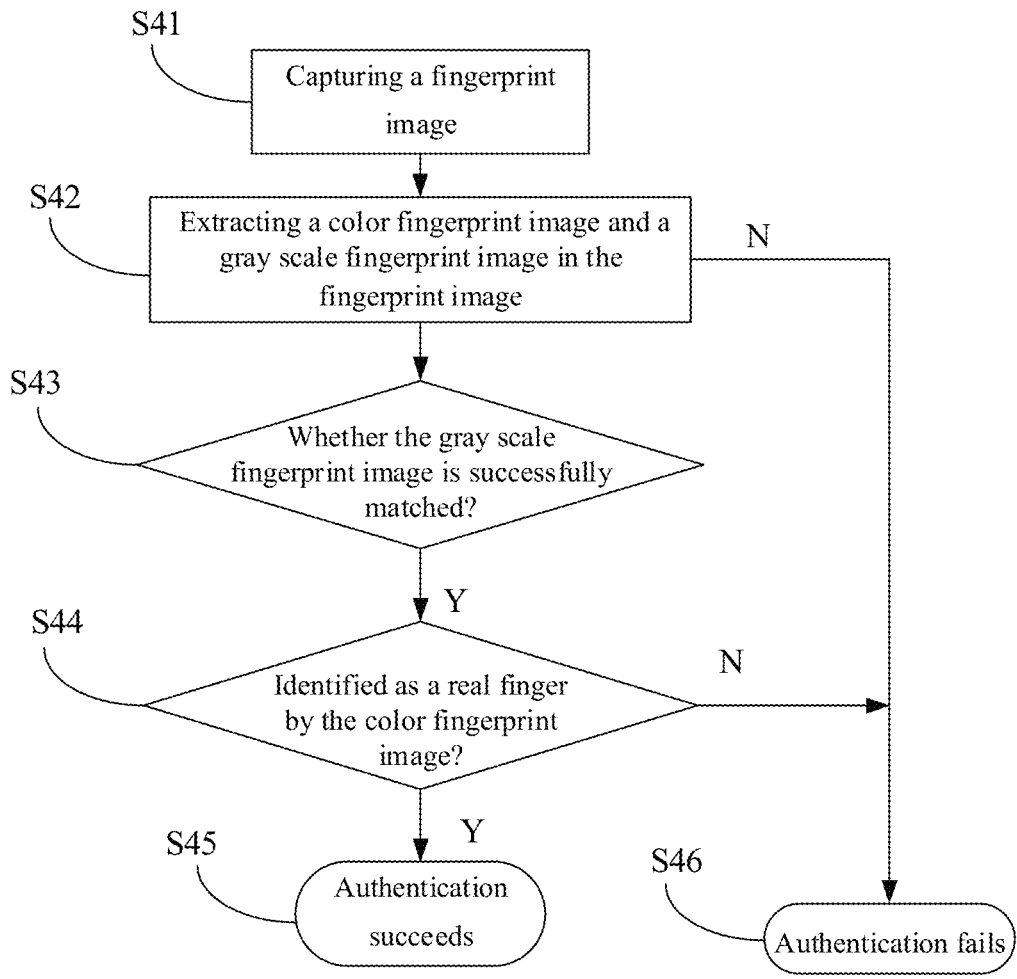
FIG. 9 is a schematic flowchart of a fingerprint identification method according to another embodiment of the present application.

Hereinafter, a fingerprint identification method according to an embodiment of the present application will be described with reference to the specific embodiment shown in FIG. 9. As shown in FIG. 9, the method may include the following contents S41, a fingerprint image is captured through an optical fingerprint sensor; where the fingerprint image includes a fingerprint image captured by ordinary pixel units and a fingerprint image captured by characteristic pixel units.

Further, in S42, in the fingerprint image, the fingerprint image (denoted as a gray scale fingerprint image) captured by the ordinary pixel units and the fingerprint image captured by the characteristic pixel units (that is, a color fingerprint image) are extracted and recombined;

Then, in S43, the gray scale fingerprint image is matched with a registered fingerprint template to determine whether the match is successful.

If the match is successful, S44 is executed; otherwise, S46 is executed. In S46, authentication is determined to be failure and an operation of triggering the fingerprint authentication is refused to be executed, for example, an operation of screen unlocking or payment.

It should be understood that in said S43, before fingerprint matching is performed, processing such as interpolation or fitting may be performed on fingerprint information missed at the characteristic pixel unit in the gray scale fingerprint image to obtain a complete fingerprint image, and the specific implementation may refer to the related description of the foregoing embodiments.

In S44, whether it is from a real finger according to the color fingerprint image.

Specifically, the color fingerprint image may be input to a deep learning network to determine whether the color fingerprint image is from a real finger.

If it is from a real finger, S45 is executed, if it is determined that authentication succeeds, an operation of triggering fingerprint authentication is executed, for example, an operation of screen unlocking or payment.

It should be understood that in the embodiment of the present application, after S42, S44 may be first executed and when it is determined that it is from a real finger, S43 may be executed, otherwise, it is directly determined that fingerprint authentication fails, and a specific execution process is not specifically limited here.

Figure 10:
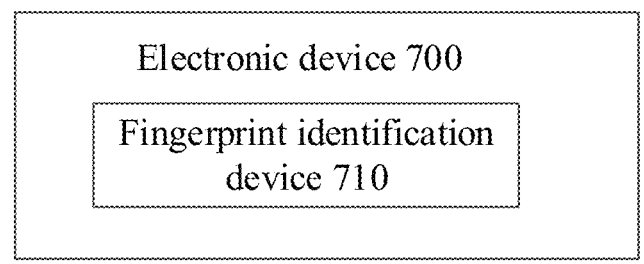
FIG. 10 is a schematic block diagram of an electronic device according to an embodiment of the present application.

As shown in FIG. 10, the embodiment of the present application also provides an electronic device 700, which may include a fingerprint identification device 710, and the fingerprint identification device 710 may be the fingerprint identification device 20 in the foregoing device embodiment, which can be used to execute contents in the method embodiment shown in FIGS. 8 to 9, which will not be repeatedly described here for brevity.

It should be understood that the processor of the embodiment of the present application may be an integrated circuit chip with signal processing capability. In an implementation process, steps of the foregoing method embodiments may be completed by using an integrated logical circuit of hardware in the processor or an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the methods disclosed in the embodiments of the present application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method in combination with hardware of the processor.

It may be understood that the fingerprint identification device in the embodiments of the present application may further include a memory, which may be a volatile memory or a nonvolatile memory, or may include a volatile memory and a nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM) and used as an external cache. By way of example and not limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification aims to include but is not limited to these memories and any memory of another proper type.

An embodiment of the present application further provides a computer readable storage medium, where the computer readable storage medium stores one or more programs, and the one or more programs include an instruction. When the instruction is executed by a portable electronic device that includes a plurality of application programs, the portable electronic device can execute the method in the embodiment shown in FIG. 8.

The embodiment of the present application also provides a computer program including instructions that, when executed by a computer, cause the computer to execute the method of the embodiment shown in FIG. 8.

An embodiment of the present application further provides a chip including an input and output interface, at least one processor, at least one memory and a bus, where the at least one memory is configured to store an instruction, the at least one processor is configured to call an instruction in the at least one memory to execute the method of the embodiment shown in FIG. 8.

A person of ordinary skill in the art may be aware that units and algorithm steps in the examples described with reference to the embodiments disclosed in this specification may be implemented by electronic hardware or a combination of computer software and electronic hardware. Whether these functions are performed by hardware or software depends on particular applications and designed constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in another manner. For example, the described apparatus embodiment is merely an example. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. A fingerprint identification device, comprising:
   an optical fingerprint sensor comprising a plurality of pixel units; and
   at least two filter units disposed above at least two pixel units of the plurality of pixel units, wherein each filter unit corresponds to at least one pixel unit, and the at least two filter units comprise filter units in at least two colors;

wherein a fingerprint image with at least two colors of an object to be identified captured by the at least two pixel units is used to determine whether the object to be identified is a real finger;

the at least two filter units constitute at least one filter unit group, each filter unit group comprises at least two filter units, and adjacent filter units in the filter unit group comprise filter units in at least two colors; and a green filter layer is disposed above other pixel units except the at least two pixel units in the plurality of pixel units, the adjacent filter units in the filter unit group comprise a red filter unit and a blue filter unit exclusively; or no filter layer is disposed above the other pixel units, the adjacent filter units in the filter unit group comprise at least two of a red filter unit, a green filter unit and a blue filter unit.

2. The device according to claim 1, wherein colors of the at least two filter units are different from a color of a filter layer disposed above other pixel units except the at least two pixel units in the plurality of pixel units, or no filter layer is disposed above the other pixel units.

3. The device according to claim 2, wherein a ratio of a number of the at least two filter units to a total number of the plurality of pixel units is less than a first threshold, and a number of consecutive filter units in the at least two filter units is less than a second threshold.

4. The device according to claim 1, wherein the fingerprint identification device further comprises:

a processor, configured to process, through a deep learning network, a fingerprint image of an object to be identified captured by the at least two pixel units to determine whether the object to be identified is a real finger, and perform fingerprint identification according to a fingerprint image captured by other pixel units except the at least two pixel units in the plurality of pixel units.

5. The device according to claim 4, wherein the processor is further configured to:

extract, from fingerprint images of a plurality of real fingers and fake fingerprints captured by the optical fingerprint sensor, sample values of the pixel units corresponding to the filter units in each fingerprint image, and recombine the sample values to obtain a color fingerprint image; and input the color fingerprint image into the deep learning network for training to obtain a model and a parameter of the deep learning network.

6. A fingerprint identification method, comprising:

capturing a fingerprint image of an object to be identified through a plurality of pixel units of an optical fingerprint sensor, wherein at least two filter units are disposed above at least two pixel units of the plurality of pixel units, each filter unit corresponds to at least one pixel unit, and the at least two filter units comprise filter units in at least two colors; and determining, according to a fingerprint image with at least two colors of the object to be identified captured by the at least two pixel units, whether the object to be identified is a real finger;

wherein the determining, according to the fingerprint image with at least two colors of the object to be identified captured by the at least two pixel units, whether the object to be identified is the real finger comprises:

processing, through a deep learning network, the fingerprint image of the object to be identified captured by the at least two pixel units to determine whether the object to be identified is the real finger.

7. The method according to claim 6, further comprising:

capturing fingerprint images of a plurality of real fingers and fake fingers through the optical fingerprint sensor;

extracting sample values of the pixel units corresponding to the filter units in each fingerprint image, and recombining the sample values to obtain a color fingerprint image; and inputting the color fingerprint image into the deep learning network for training to obtain a model and a parameter of the deep learning network.

8. The method according to claim 6, further comprising:

performing fingerprint identification according to a fingerprint image captured by other pixel units except the at least two pixel units in the plurality of pixel units.

9. The method according to claim 6, wherein colors of the at least two filter units are different from a color of a filter layer disposed above other pixel units except the at least two pixel units in the plurality of pixel units, or no filter layer is disposed above the other pixel units;

wherein a ratio of a number of the at least two filter units to a total number of the plurality of pixel units is less than a first threshold, and a number of consecutive filter units in the at least two filter units is less than a second threshold.

10. The method according to claim 6, wherein the at least two filter units constitute at least one filter unit group, each filter unit group comprises at least two filter units, and adjacent filter units in the filter unit group comprise filter units in at least two colors.

11. A fingerprint identification device configured to be disposed in an electronic device with a display screen, comprising:

an optical fingerprint sensor, configured to be disposed below the display screen, and a fingerprint detecting region of the optical fingerprint sensor is located within a display region of the display screen, wherein the optical fingerprint sensor comprises a pixel array having a plurality of pixel units, the plurality of pixel units comprises characteristic pixel units and ordinary pixel units, and the characteristic pixel units are distributed and arranged in the pixel array of the optical fingerprint sensor;

a plurality of filter units, disposed above the optical fingerprint sensor, wherein each filter unit corresponds to at least one characteristic pixel unit, the plurality of filter units comprises a first filter unit and a second filter unit of different colors, and the characteristic pixel units are used to receive light signals formed by an object to be identified above the display screen and passing through the first filter unit and the second filter unit, and the light signals are used to determine whether the object to be identified above the display screen is a real finger;

wherein a light transmissive material or an air gap is formed above the ordinary pixel units of the pixel array, and the ordinary pixel units are used to receive fingerprint detection signals formed by a finger above the display screen and passing through the light transmissive material or the air gap, so as to obtain a grayscale fingerprint image of the finger.

12. The device according to claim 11, the first filter unit and the second filter unit are respectively a red filter unit that allows the passage of the red wavelength band and a blue filter unit that allows the passage of the blue wavelength band.

13. The device according to claim 11, the plurality of filter units constitute a plurality of filter unit groups, and the plurality of filter unit groups are discretely distributed in the pixel array of the optical fingerprint sensor, and each filter unit group includes at least one first filter unit and at least one second filter unit and adjacent filter units in each filter unit group include at least a red filter unit and a blue filter unit, wherein the adjacent filter units comprise physically adjacent or intermediate ordinary pixel units.

14. The device according to claim 11, the light signals are reflected lights formed by a light spot displayed by self-emitting display units of the display screen in fingerprint detecting region irradiating the object to be identified above the display screen, wherein the reflected lights pass through the display screen and return to the optical fingerprint sensor via the filter units.

15. The device according to claim 11, further comprising:
- a processor, configured to process, through a deep learning network, a fingerprint image of the object to be identified captured by the characteristic pixel units to determine whether the object to be identified is a real finger;
- the processor is further configured to: extract, from fingerprint images of a plurality of real fingers and fake fingerprints captured by the optical fingerprint sensor, sample values of the characteristic pixel units corresponding to the filter units in each fingerprint image, and recombine the sample values to obtain a color fingerprint image; and
- input the color fingerprint image into the deep learning network for training to obtain a model and a parameter of the deep learning network.

\* \* \* \* \*